US009109860B2

(12) United States Patent
Welker et al.

(10) Patent No.: US 9,109,860 B2
(45) Date of Patent: Aug. 18, 2015

(54) ACTIVE BLAST COUNTERMEASURES

(71) Applicant: TenCate Advanced Armour USA, INC., Newark, OH (US)

(72) Inventors: Victor Wayne Welker, Los Olivos, CA (US); Marc David Taylor, Goleta, CA (US); Andrew R. Hansen, Goleta, CA (US); Joergen Leif Svane, Aabenraa (DK); Steven Renick, Santa Barbara, CA (US)

(73) Assignee: Tencate Advanced Armor USA, Inc., Newark, OH (US)

( * ) Notice: Subject to any disclaimer, the term of this patent is extended or adjusted under 35 U.S.C. 154(b) by 35 days.

(21) Appl. No.: 14/014,799

(22) Filed: Aug. 30, 2013

(65) Prior Publication Data

US 2014/0214281 A1     Jul. 31, 2014

Related U.S. Application Data

(60) Provisional application No. 61/695,435, filed on Aug. 31, 2012.

(51) Int. Cl.
*F41H 11/00* (2006.01)
*B60R 21/01* (2006.01)

(52) U.S. Cl.
CPC ............... *F41H 11/00* (2013.01); *B60R 21/01* (2013.01)

(58) Field of Classification Search
None
See application file for complete search history.

(56) References Cited

U.S. PATENT DOCUMENTS

| 6,496,764 | B1 | 12/2002 | Wang | |
|---|---|---|---|---|
| 6,915,196 | B2 * | 7/2005 | Rao et al. | 701/45 |
| 6,938,924 | B2 * | 9/2005 | Feldman et al. | 280/755 |
| 7,386,384 | B2 * | 6/2008 | Le et al. | 701/70 |
| 7,467,684 | B2 * | 12/2008 | Wang et al. | 180/282 |
| 8,095,269 | B2 * | 1/2012 | Pruett et al. | 701/39 |
| 8,578,834 | B2 * | 11/2013 | Tunis et al. | 89/36.02 |
| 8,584,572 | B2 * | 11/2013 | Tunis et al. | 89/36.09 |
| 8,739,676 | B2 * | 6/2014 | Ames | 89/36.08 |
| 2002/0033755 | A1 | 3/2002 | Ishizaki et al. | |
| 2005/0065688 | A1 * | 3/2005 | Rao et al. | 701/45 |
| 2005/0107933 | A1 | 5/2005 | Kuroda et al. | |
| 2005/0242557 | A1 * | 11/2005 | Wang et al. | 280/755 |
| 2006/0229790 | A1 * | 10/2006 | Le et al. | 701/70 |

(Continued)

OTHER PUBLICATIONS

PCT/US2013/057503, International Search Report and Written Opinion, Feb. 7, 2014, 12 pages.

*Primary Examiner* — Yonel Beaulieu
*Assistant Examiner* — Krishnan Ramesh
(74) *Attorney, Agent, or Firm* — Kilpatrick Townsend & Stockton LLP; Dean W. Russell; James E. Golladay

(57) ABSTRACT

An explosion countermeasure system is provided including a first sensor device with a plurality of accelerometers configured to detect vertical acceleration of a vehicle; a countermeasure; a safe and arming device configured to impede activation of the countermeasure; and a processor in communication with the first sensor device and the safe and arming device. The processor may be configured to process acceleration signals received from the first sensor device and to make ready the safe and arming device and initiate the countermeasure based on results of processing the acceleration signals. Making ready the safe and arming device may be based on an initial acceleration exceeding a first threshold, and initiating the countermeasure may be based on the initial acceleration exceeding a second threshold and a velocity change exceeding a third threshold.

28 Claims, 15 Drawing Sheets

(56) References Cited

U.S. PATENT DOCUMENTS

| | | | |
|---|---|---|---|
| 2010/0085890 A1* | 4/2010 | Hinnant et al. | 370/253 |
| 2010/0185354 A1* | 7/2010 | Pruett et al. | 701/29 |
| 2011/0148147 A1* | 6/2011 | Tunis et al. | 296/187.07 |
| 2011/0245994 A1 | 10/2011 | Sloman | |
| 2011/0285982 A1 | 11/2011 | Breed | |
| 2012/0193940 A1* | 8/2012 | Tunis et al. | 296/187.07 |
| 2012/0239247 A1* | 9/2012 | Eridon | 701/36 |
| 2012/0240759 A1* | 9/2012 | Halliday | 89/36.02 |
| 2013/0204496 A1* | 8/2013 | Sloman | 701/45 |
| 2013/0261900 A1* | 10/2013 | Hu et al. | 701/45 |
| 2013/0328713 A1* | 12/2013 | Svane et al. | 342/70 |
| 2014/0013936 A1* | 1/2014 | Halliday | 89/36.08 |
| 2014/0096672 A1* | 4/2014 | Ames | 89/36.08 |
| 2014/0195199 A1* | 7/2014 | Uluyol | 702/189 |

\* cited by examiner

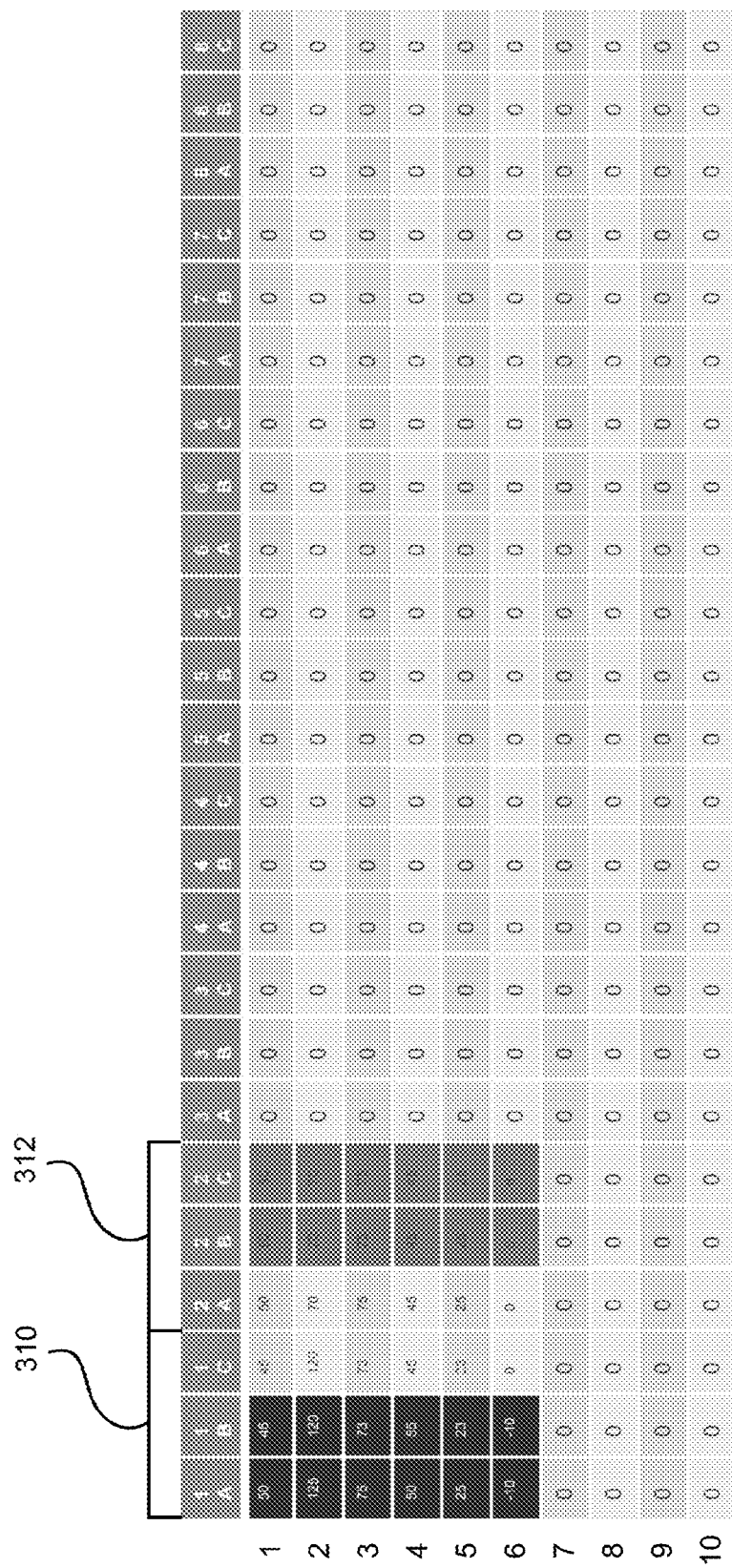

| 410 | 412 | 420 | 422 | 430 | 432 | 434 | 440 |
|---|---|---|---|---|---|---|---|
| Sensor | Accel | Subject | Stand and Arm 1 and Arm 2 | 3x Accels have a value of >=100 samples out of the 10 stored in the buffer | 2/3 Accels have a value of >=100 samples out of the 10 stored in the buffer | Length >=100 | Used F/G for desired code spanking process |
| 1 | 1A | Any 1 | | 3/3 Accels | 2/3 Accels | 2/3 Accels | |
| 1 | 1B | Any 1 | | | | | |
| 1 | 1C | Any 1 | | | | | |
| 2 | 2A | Any 1 | | 2/3 Accels | 2/3 Accels | 2/3 Accels | |
| 2 | 2B | Any 1 | | | | | |
| 2 | 2C | Any 1 | | | | | |
| 3 | 3A | Any 1 | | 2/3 Accels | 2/3 Accels | 2/3 Accels | |
| 3 | 3B | Any 1 | | | | | |
| 3 | 3C | Any 1 | | | | | |
| 4 | 4A | Any 1 | | 2/3 Accels | 2/3 Accels | 2/3 Accels | |
| 4 | 4B | Any 1 | | | | | |
| 4 | 4C | Any 1 | | | | | |
| 5-8 | 8A | Any 1 | | ARM ONLY | ARM ONLY | ARM ONLY | |
| 5-8 | 8B | Any 1 | | | | | |
| 5-8 | 8C | Any 1 | | | | | |

State Description

| State | Entry Criteria | Return to Previous State Criteria | Actions |
|---|---|---|---|
| Init and Self Test | Power On | | Perform Self Test. Initialize buffer with 0's |
| Safe Idle | Pass Self Test | | Monitor Data |
| Arm | At least one value for sensors 1-8 >= |50| in last 10 samples | Buffer values for sensors 1-8 <|50| in last 10 samples | Send ARM 1 and ARM 2 commands |
| Fire | SUM of 6 sequential data points in 10 point buffer >= 300 for 2of3 accelerometers in sensor X (1-4) except if quadrant X is already fired.<br><br>& SUM of 6 sequential data points in 10 point buffer >= 150 for 2 of 3 accelerometers in sensor Y (1-4 other than senor X)<br><br>& L >= 100 for 2 of 3 accelerometers in sensor 1-4 | QUAD X Fired | Keep on ARM1 and ARM2<br><br>*FIRE ANY QUAD X (1-4) with corresponding sensor (1-4) SUM >=300 & not already fired (more than one quadrant may meet this criteria at the same time step)* |

FIG. 10

ACTIVE BLAST COUNTERMEASURES

CROSS REFERENCE TO RELATED APPLICATIONS

This application claims priority under 35 USC 119(e) to U.S. Provisional Patent Application No. 61/695,435, filed Aug. 31, 2012, titled "ABDS PROCESSOR AND SENSOR DESCRIPTION," the contents of which are hereby incorporated by reference in its entirety.

BACKGROUND OF THE INVENTION

The present invention generally relates to systems and methods for actively countering forces experienced by an object or person and more particularly, although not exclusively, to systems and methods for actively countering forces experienced by a manned (or unmanned) vehicle upon encountering blast waves of a mine or other explosive device or other undesired forces. The technology may find applicability, for example, in TenCate's ABDS™ active blast countermeasure system, and similar products.

U.S. Patent Application Publication No. 2012/0239247 by Eridon, the contents of which also are incorporated herein by this reference, purports to disclose "systems and methods for mitigating the effects of sudden accelerative forces on vehicles due to, for example, land mines and improvised explosive devices (IEDs)." See Eridon Application, p. 1, ¶ 0002. Described generally in the Eridon Application is such a system having sensors, a control system, countermeasures, and a human interface.

Absent from the skeletal Eridon Application is, among other things, any discussion of numerous components of a satisfactory countermeasures system. No comprehensive trigger and activation system (TAS) is described, for example, and the sole identifications of a "human interface" in the Eridon Application are a block in the diagram of its FIG. 1 and the statement that it may include "any combination of processors, memory, storage, displays, [and] input devices." See id., p. 3, ¶ 0029. Further, the only sensor detail provided in the Eridon Application relates to a particular piezoresistive accelerometer sold by a company called Measurement Specialties, and the countermeasures identification is limited to, generically, "an explosive or a propellant" possibly provided by DuPont. See id., ¶¶ 0027-28.

U.S. patent application Ser. No. 13/909,295 by Dobriski et al., entitled "ACTIVE COUNTERMEASURES SYSTEMS AND METHODS," the contents of which also are incorporated herein by this reference, provides a more detailed description of systems including multiple components and techniques for creating active countermeasures that are deployable under a wide variety of hostile and other conditions. An exemplary TAS may, for example, comprise any or all of a first responder unit (FRU), a control display assembly (CDA), processors, sensors, and an electronic safe and arm device (ESAD). Together with appropriate countermeasures, the TAS may be used to protect crew members of a vehicle from injury or death caused by, for example, IED or mine blasts or vehicle collisions or rollovers.

BRIEF SUMMARY OF THE INVENTION

The present subject matter includes systems and methods for detecting explosions and/or deploying explosion countermeasures, such an in vehicles. Exemplary embodiments may include, for example, utilizing and evaluating multiplexed acceleration signals from multiple sensor packages disposed in different locations of a vehicle. The different locations may sometimes be referred to generically as different "quadrants" of the vehicle, although this should not be interpreted as limiting the sensor packages to four different locations. As will be described in further detail, embodiments of the invention may include, for example, five or more sensor packages.

According to first aspects of the invention, an explosion countermeasure system, may include one or more of a first sensor device including a plurality of accelerometers configured to detect vertical acceleration of a vehicle, and a processor in communication with the first sensor device. In embodiments, the processor may be configured to process acceleration signals received from the first sensor device and to initiate a countermeasure based on results of processing the acceleration signals. In embodiments, the plurality of accelerometers may be included in a sensor package and may be arranged to detect acceleration in the same direction. In embodiments, the accelerometers in the sensor package may share a sampling channel, with each of the accelerometers in the sensor package being assigned a different time slot.

In embodiments, the sensor package may provide acceleration signals with a combined sampling rate of, for example, about 6 kHz. In embodiments, exemplary systems may include a plurality of the sensor packages, e.g. five or more sensor packages, six sensor packages, seven sensor packages, eight sensor packages, etc.

In embodiments, initiating the countermeasure may require accelerations determined from at least two of the sensor packages to each exceed a first threshold. In embodiments, the determination to initiate the countermeasure may require an acceleration determined from one of the sensor packages to exceed a first threshold, and an acceleration determined from another of the sensor packages to each exceed a second threshold. The second threshold may be different than the first threshold, or it may be substantially equal to the first threshold.

In embodiments, the processor may be configured to selectively initiate individual countermeasures in different areas of the vehicle based on signals received from different sensor packages associated with each of the different areas of the vehicle.

In embodiments, the processor may be configured with an integration module that integrates the acceleration signals to calculate a change in velocity. In embodiments, initiating the countermeasure may be based on (a) an initial acceleration exceeding a first threshold, and (b) a velocity change exceeding a second threshold. In embodiments, the first threshold may be, for example, greater than 25 g, greater than 40 g, greater than 100 g, in a range of about 25 g to 200 g, in a range of about 40 g to 60 g, or about 50 g.

In embodiments, determining whether the second threshold is exceeded may be based on a sum of values for a particular sensor package included in a buffer. In embodiments, the buffer may be configured to store values for approximately 1 ms to 10 ms of data. In embodiments, the sum of values may be, for example, from about a 3 ms window in the buffer. In embodiments, the processor may be configured to initiate the countermeasure within about 10 ms, or less than 15 ms, of the initial acceleration exceeding the first threshold.

In embodiments, the processor may be configured to make ready a safe and arming device based on the initial acceleration exceeding the first threshold, prior to making a determination to initiate the at least one countermeasure. In embodiments, the processor may be configured to make ready the safe and arming device and initiate the at least one countermeasure within about 10 ms of the initial acceleration exceeding the first threshold.

In embodiments, systems may include a safe and arming device.

In embodiments, the processor may be configured to selectively initiate individual countermeasures from among a plurality of countermeasures, to make ready safe and arming devices for all of the plurality of countermeasures based on the initial acceleration exceeding the first threshold, and to disarm at least one of the safe and arming devices based on buffered acceleration data for one or more of the sensor packages falling below the first threshold for a predetermined period of time.

In embodiments, the system may include at least one countermeasure device, such as, for example, one or more of a mass ejector and a thruster.

In embodiments, the processor may be configured to initiate an occupant protection device.

In embodiments, the processor may be in communication with a second sensor device that senses a different type of condition than the first sensor device, and the processor may be configured to process signals received from the second sensor device in determining whether to initiate the countermeasure. Sensors associated with the present invention may sense any or all of pressure, angular movement rate, acceleration, strain (deformation), force, displacement, velocity, or electric or magnetic field strength. Because the sensors may be deployed in electrically noisy environments, signals from the sensors may be encoded using, for example, Manchester coding principles. Preferably, multiple sensors are used on each vehicle, with at least some not co-located with others. If desired, countermeasures deployment may be conditioned on certain signal types and durations being received from multiple non-collocated sensors.

According to further aspects of the invention, an explosion countermeasure system may include one or more of a first sensor device including a plurality of accelerometers configured to detect vertical acceleration of a vehicle; a countermeasure; a safe and arming device configured to impede activation of the countermeasure; and a processor in communication with the first sensor device and the safe and arming device. In embodiments, the processor may be configured to process acceleration signals received from the first sensor device and to make ready the safe and arming device and initiate the countermeasure based on results of processing the acceleration signals. In embodiments, making ready the safe and arming device may be based on an initial acceleration exceeding a first threshold, and initiating the countermeasure may be based on the initial acceleration exceeding a second threshold and a velocity change exceeding a third threshold. In embodiments, the first and second thresholds may be different, or they may be substantially equal. In embodiments, the first threshold may be, for example, greater than 25 g, greater than 40 g, greater than 100 g, in a range of about 25 g to 200 g, in a range of about 40 g to 60 g, or about 50 g.

In embodiments, determining whether the third threshold is exceeded may be based on a sum of values for a particular sensor included in a buffer. In embodiments, the buffer may be configured to store values for approximately 1 ms to 10 ms of data.

In embodiments, the processor may be configured to make ready the safe and arming device and initiate the countermeasure within about 10 ms, or less than 15 ms, of the initial acceleration exceeding at least one of the first threshold and the second threshold.

According to further aspects of the invention, an explosion detection system may include one or more of a receiving means for receiving acceleration signals via a plurality of sampling channels, each sampling channel including multiplexed acceleration signals from a plurality of sensors; and a processor configured to process the multiplexed acceleration signals from the plurality of sampling channels, determine the occurrence of an explosion based on the acceleration signals, and initiate an explosion countermeasure based on the determination that an explosion has occurred.

In embodiments, acceleration signals received on a sampling channel may provide a sampling rate of, for example, about 6 kHz. In embodiments, the sensor package may be configured to sample the internal accelerometer faster than 6 kHz (e.g. 1 MHz), filter the data, and send out packets at 2 kHz.

In embodiments, the processor may be configured to determine the occurrence of the explosion and initiate the explosion countermeasure within about 10 ms, or less than 15 ms, of registering an initial acceleration exceeding a first threshold.

In embodiments, the processor may be configured to initiate charging of a safe and arming device based on the initial acceleration exceeding the first threshold, prior to making a determination to initiate the explosion countermeasure.

According to further aspects of the invention, methods, as well as non-transitory computer-readable storage medium, may also be provided including steps and/or instructions that support explosion countermeasure systems and/or explosion detection systems such as those described herein.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention claimed. The detailed description and the specific examples, however, indicate only preferred embodiments of the invention. Various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the related technology. No attempt is made to show structural details of technology in more detail than may be necessary for a fundamental understanding of the invention and various ways in which it may be practiced. In the drawings:

FIG. 3 shows a buffer that may be loaded by signals from the sensors shown in FIG. 2.

FIG. 6 shows the buffer from FIG. 3 including acceleration values from sensors 1A, 1B, 1C, 2A, 2B and 2C loaded in the buffer.

FIG. 7 shows the buffer from FIG. 3 including different acceleration values from sensors 1A, 1B, 1C, 2A, 2B and 2C loaded in the buffer.

FIG. 8 is a block diagram showing application of an exemplary algorithm to acceleration buffer values, such as shown in FIGS. 6 and 7.

FIG. 10 is a state description table showing exemplary processing determinations according to aspects of the invention.

DETAILED DESCRIPTION OF THE INVENTION

Figures 1A, 1B:
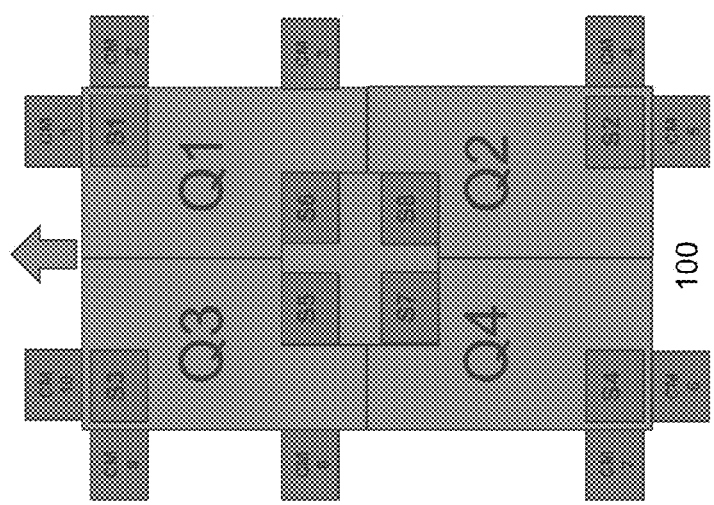
FIG. 1A is a simplified schematic diagram showing a plurality of sensor packages and countermeasures disposed in a vehicle according to aspects of the invention.
FIG. 1B is a chart showing correspondence between the sensor packages and countermeasures shown in FIG. 1A.

It is understood that the invention is not limited to the particular methodology, protocols, etc., described herein, as these may vary as the skilled artisan will recognize. It is also to be understood that the terminology used herein is used for the purpose of describing particular embodiments only, and is not intended to limit the scope of the invention. It also is to be noted that as used herein and in the appended claims, the singular forms "a," "an," and "the" include the plural reference unless the context clearly dictates otherwise. Thus, for example, a reference to "a sensor" is a reference to one or more sensors and equivalents thereof known to those skilled in the art.

Unless defined otherwise, all technical terms used herein have the same meanings as commonly understood by one of ordinary skill in the art to which the invention pertains. The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law.

FIG. 1A shows an exemplary arrangement of sensor packages (S1-S8) disposed in different parts of a vehicle 100. In the embodiment shown in FIG. 1, each "quadrant" (Q1-Q4) includes at least one sensor package (e.g. S1-S4, respectively) and may include one or more sensor packages (e.g. S5-S8). In some embodiments, sensor packages S5-S8 may be replaced by a single sensor package, which may be placed, for example, in an approximate center of the vehicle, or other location. The placement of sensor package S1-S8 may vary, for example, based on specific weight distributions of the vehicle, rigidity distributions, wheelbase dimensions, and other factors that may affect the responsiveness of the vehicle to an explosion, collision and/or dynamic driving incident.

As also shown in FIG. 1A, each vehicle quadrant may include one or more explosion countermeasures (CM1-CM10). As described further herein, one or more of the countermeasures may be associated with a quadrant and/or sensor package(s) such that selective activation of appropriate countermeasures may be made based on the acceleration data from specific sensor packages. In the embodiment shown in FIG. 1A, countermeasures CM1 and CM10 are disposed in proximity to the front corners of the vehicle 100, countermeasures CM5 and CM6 are disposed in proximity to the rear corners of the vehicle 100, countermeasures CM2 and CM4 are disposed in proximity to the right side corners of the vehicle 100, countermeasures CM7 and CM9 are disposed in proximity to the left side corners of the vehicle 100, and countermeasures CM3 and CM8 are disposed in a mid-portion on either side of the vehicle 100 (in this case forward of center). In embodiments, exemplary systems may include various numbers of sensor packages, e.g. five or more sensor packages, six sensor packages, seven sensor packages, eight sensor packages, etc. In embodiments, exemplary systems may include various numbers of countermeasures, e.g. four or more countermeasures, eight or more countermeasures, twelve or more countermeasures, sixteen or more countermeasures, etc.

FIG. 1B shows a firing correspondence between the sensor packages S1-S8, the quadrants Q1-Q4 and the countermeasures CM1-CM10. As can be seen in FIG. 1B, the front quadrants Q1 & Q3, include three countermeasures each (i.e. CM1-CM3 and CM8-CM10, respectively). Therefore, confirmation of a firing event for sensor package S1 (along with any necessary confirmation from other sensor packages), may result in CM1-CM3 activating, without activating CM4-CM10. Sensor packages S5-S8 may not be specifically associated with individual countermeasures and may be used, for example, to confirm firing events detected by other sensor packages, activate additional arm locations, and/or other data collection. It should be understood that the exemplary arrangements shown in FIG. 1A, and related correspondences shown in FIG. 1B, may be altered, e.g. by including different numbers of sensor packages, different numbers of countermeasures, different locations, and/or different relationships, without departing form the overall concepts of the invention.

Figure 2A:
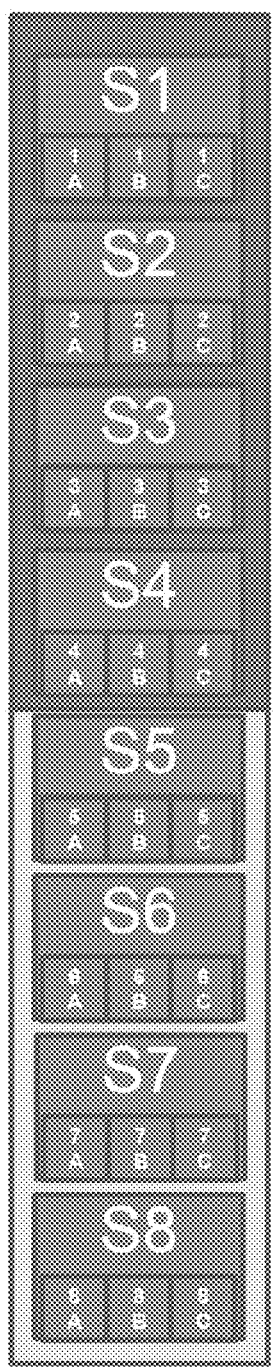
FIG. 2A is a block diagram with further details of accelerometers included in the sensor packages shown in FIG. 1A.

FIG. 2A shows additional details of sensor arrangements that may be included, for example, in the sensor packages S1-S8, shown in FIG. 1A. As shown in FIG. 2A, the eight sensor packages S1-S8 may each include a plurality of (for example, three) accelerometer chips, labeled 1A-1C, 2A-2C, etc. In embodiments, each accelerometer chip in a sensor package may be oriented, or otherwise configured, to detect acceleration in the same direction, e.g. in a vertical direction with respect to the vehicle. Having multiple accelerometers in each sensor package, oriented in the same direction, may provide advantages in improving the reliability of each sensor package by having redundancy for "voting," as well as allowing the sensor packages to continue to reliably function in harsh conditions, e.g. where individual sensor chips may fail due to environmental or other conditions.

In embodiments, each accelerometer chip in a sensor package may be assigned a different timeslot between synchronization signals. Thus, an increase in sampling rate may be obtained. For example, in some embodiment, a 6 kHz effective sample rate may be provided from sensor packages including accelerometer chips each having a 2 kHz sample rate.

In embodiments, the sensor package may be configured to sample the internal accelerometer(s) faster than 6 kHz (e.g. 1 MHz), filter the data, and send out packets at 2 kHz. Further details regarding an exemplary embodiment including such features are shown in FIG. 2B.

Figure 2B:
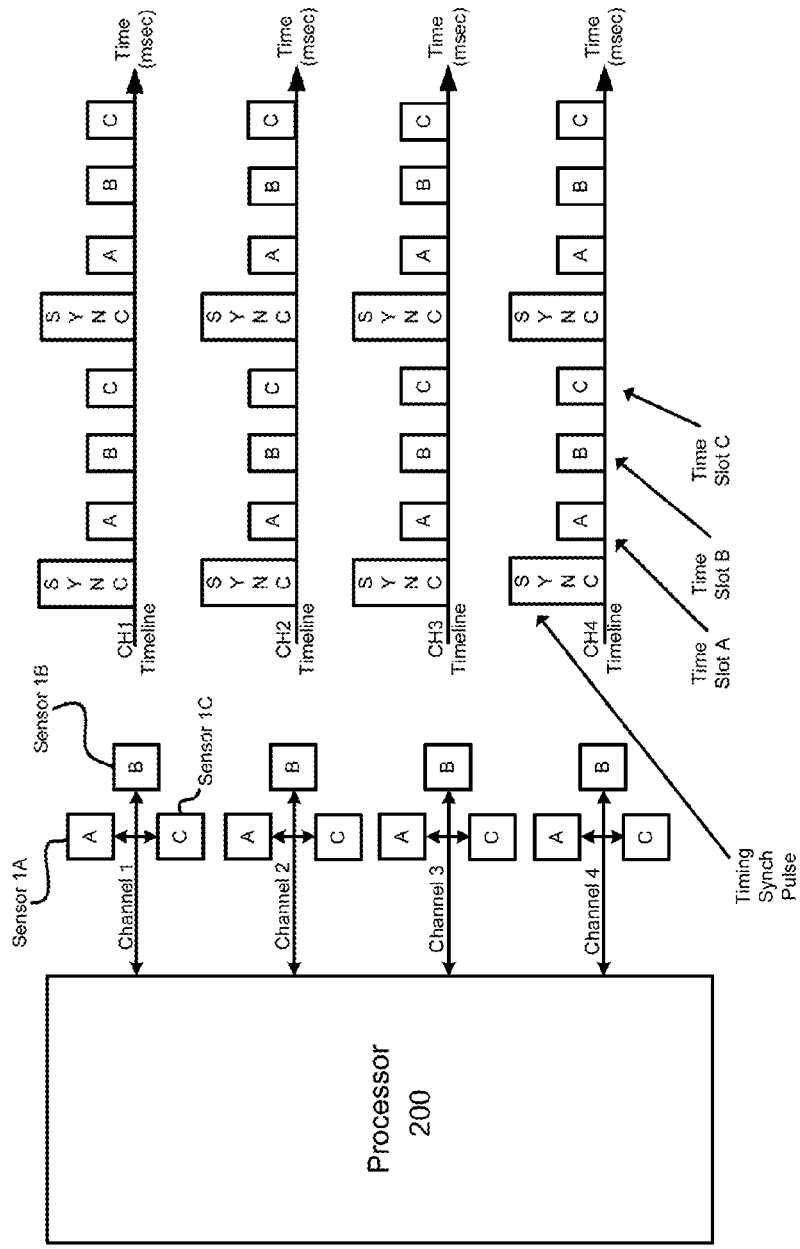
FIG. 2B is a timing diagram showing an exemplary accelerometer signal multiplexing pattern according to aspects of the invention.

FIG. 2B schematically shows a combination of four sensor packages that may be arranged on different parts of a vehicle. Each sensor package is assigned to a channel that carries signals from multiple (in this case three) accelerometer chips within the sensor package to a processor 200. The accelerometers may be configured to detect vertical acceleration of the vehicle, e.g. by orienting the accelerometers to detect vertical acceleration, rather than horizontal or lateral acceleration as may typically be found in airbag activation systems. The processor 200 may be configured to receive acceleration signals via a plurality of sampling channels (in this case channels 1-4). Each sampling channel may include multiplexed acceleration signals (e.g. in Time Slots A, B and C between each Synchronization Pulse) from a plurality of sensors, and the processor 200 may be configured to process the multiplexed acceleration signals from the plurality of sampling channels, and, as discussed further below, to determine the occurrence of an explosion based on the acceleration signals. In embodiments, the processor 200 may also be configured to make ready a safe and arming device, and/or to initiate an explosion countermeasure based on the determination that an explosion has occurred.

Figure 3:
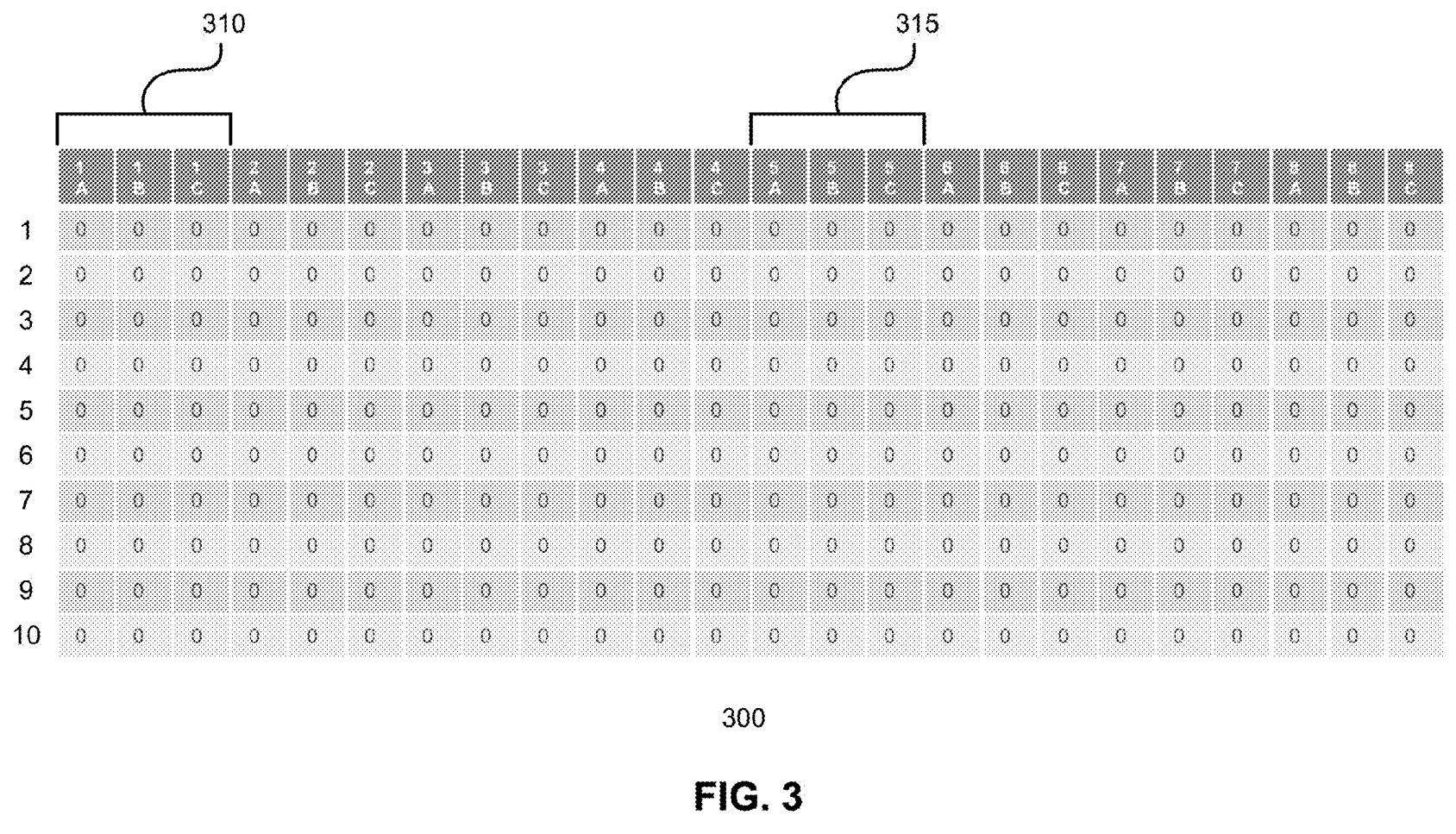

Acceleration signals received via channels such as shown in FIG. 2B may be loaded in buffer, such as the buffer 300 illustrated in FIG. 3. In embodiments, the buffer 300 may be configured to store values for approximately 1 ms to 10 ms of data. The buffer 300 may be configured to support a plurality of samples, in this case ten samples, and may be initialized with 0's, e.g. to eliminate the chance of "leftover" data. Data from each of the accelerometer chips 1A-1C, 2A-2C, etc, may be loaded into the 10 sample long buffer. For example, data from Sensor Package 1 is shown tabulated under the columns in area 310 for accelerometer chips 1A-1C, data from Sensor Package 5 is shown tabulated under the columns in area 315 for accelerometer chips 5A-5C, etc. In embodiments, the overall buffer length may be approximately 5 ms, with each sample updated approximately every 0.5 ms. In embodiments, with each update, the bottom row may "drop out," and a new row added to the top of the buffer (e.g. every 0.5 ms). The example shown in FIG. 3 is "zeroed out" with no acceleration readings in any of the buffer fields.

Figure 4:
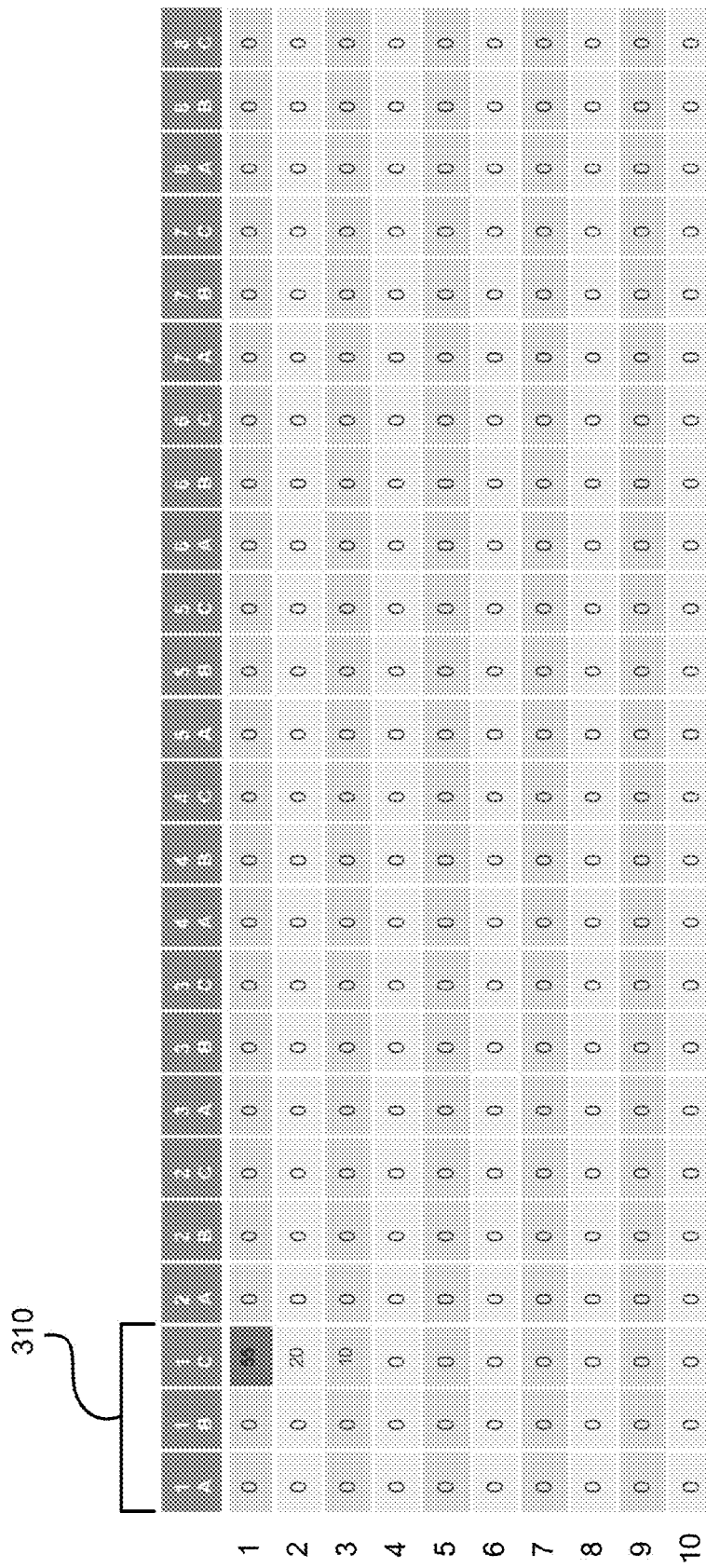
FIG. 4 shows the buffer from FIG. 3 including acceleration values from sensor 1C loaded in the buffer.

FIG. 4 shows another example of the buffer 300 from FIG. 3, including acceleration data in samples 1-3 in area 310, loaded from Sensor Package 1, Accelerometer 1C. In this example, a reading of 55 g in sample line 1 represents a value exceeding a predetermined threshold (e.g. greater than 25 g, greater than 40 g, in a range of about 25 g to 200 g, in a range of about 40 g to 60 g, or about 50 g). In embodiments, a reading, or highest absolute value in the buffer, that exceeds the predetermined threshold may be used to initiate sending arm signals to one or more safe and arming devices, e.g. to charge capacitors for an ESAD. Embodiments may also include removing arm signals, i.e. making the safe and arming devices safe, if a highest absolute value in the buffer is less than the predetermined threshold.

In embodiments, the processor 200 may be configured with an integration module that integrates the acceleration signals received from the various acceleration sensors (1A-1C, 2A-2C, etc.) to calculate a change in velocity.

Figure 5:
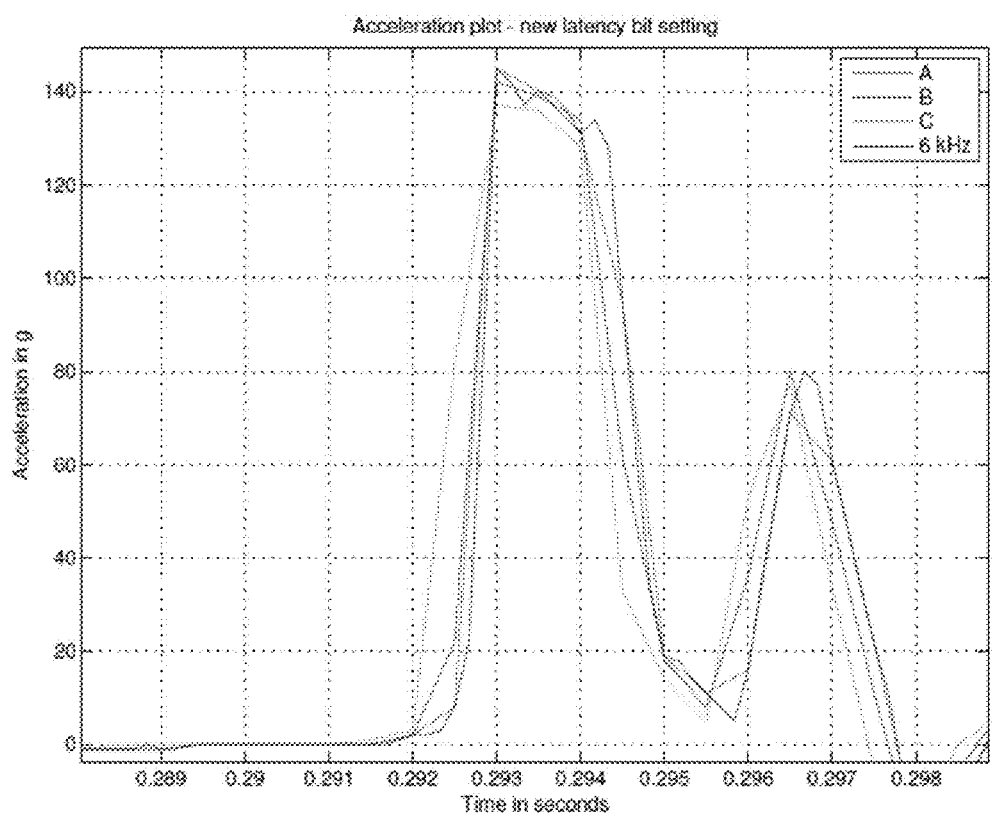
FIG. 5 is an exemplary acceleration plot that may be derived based on acceleration signals according to aspects of the invention.

An example of an acceleration plot, which may trigger a firing event, is shown in FIG. 5. FIG. 5 shows acceleration data from a plurality of sensors included in a sensor package, such as those described herein. In this example, an initial shock peaking at over 140 g is detected by multiple accelerometers occurring at about 0.293 s, and another peak of about 80 g is detected occurring at 0.2965. In embodiments, an absolute g threshold may be set to, for example, greater than 25 g, greater than 40 g, greater than 100 g, in a range of about 25 g to 200 g, in a range of about 40 g to 60 g, or about 50 g. As described further herein, such rapid and extreme acceleration changes may be used as an initial indicator that an explosion may have occurred, to make ready a safe and arming device, and/or to confirm that an explosion has occurred. Some of the factors that may be used in designing algorithms and making determinations according to aspects of the invention, are as follows.

Sum (or SUM) may be used to require a change in velocity for the system to fire. Units are, for example, G*0.5 ms, so multiply by 9.81 m/s$^2$/2000s to get into m/s i.e. sum 300~1.5 m/s delta V. One sensor may be required to have a change in velocity of ~1.5 m/s, and a second sensor may be required to have a change in velocity of ~0.75 m/s.

Window length may be used, e.g. sum is calculated over a predetermined window (3 ms is 6 data points per accelerometer in some embodiments). This may be used to limit drift, and require the change in velocity to be fast enough to reach the sum criteria within this window. Indicates a quick impulse blast event vs. drop event.

Buffer length may be set to allow one sensor to reach the fire threshold, slightly before a second one confirms it, without issue. Also, sometimes L criteria may be met slightly after sum criteria. In some embodiments, a buffer of approximately 1 ms to 10 ms, or 5 ms, is appropriate.

Length criteria (L) looks at the length of the acceleration curve. Identifies high frequency content in the signal, which tends to be characteristic of ballistic/blast events. For example:

Data Set=0, 100, −10, 100, 0, 100
L=sum delta G=520

In determining whether to activate explosion countermeasures, it may be desirable to ensure that the vehicle is actually being subjected to an explosion, as opposed to a collision or other active-driving event. In some embodiments, a SUM of sequential data points, e.g. in a buffer as previously described, may be evaluated to determine whether the SUM exceeds a predetermined threshold to confirm that an explosion is occurring. For example, a set number (e.g. 4, 5, 6, etc.) of sequential data points in a 10 point buffer may be summed for one or more accelerometers, and if the SUM is greater than or equal to a predetermined threshold (e.g. >=300 or similar value such as 200, 250, 350, 400, etc.), a safe and arming device may be made ready, additional acceleration data may be considered and/or an explosion countermeasure may be activated.

In some embodiments, it may be desirable to assess whether the readings (e.g. absolute value and/or SUM) from multiple accelerometers in a specific sensor package exceed the predetermined threshold. For example, the processor 200 may be configured to make ready a safe and arming device, consider additional acceleration data, activate an explosion countermeasure, or initiate other action, based on a determination that at least two accelerometers of a sensor package have exceeded an absolute g, or have exceeded a SUM of data points. Such safeguards may be desirable, for example, in order to avoid potentially erroneous countermeasure firings.

Similarly, in some embodiments confirmation from at least two different sensor packages may be required, e.g. an absolute value and/or SUM of sequential data points in the buffer corresponding to another sensor package may be evaluated for confirmation of a firing event. For ease of description, a first sensor package that is determined to exceed a threshold may be referred to as a "primary" sensor, and a second sensor package that is determined to exceed a threshold may be referred to as a "secondary" sensor (even though the sensors may be functionally equivalent). For example, the processor 200 may be configured such that, after a first threshold is exceeded with respect to a primary package, at least one other secondary package is evaluated to determine whether a second threshold has been exceeded. It should be noted that the first and second thresholds in this example may be the same, or different, values.

In some embodiments, the multiple sensor packages used to confirm a firing or other event may be differentiated such that specific sensor packages require confirmation from other pre-designated sensor packages. This may be advantageous for a number of reasons. For example, certain sensor packages may be attached to parts of the vehicle that might be blown off in an explosion (e.g. sensor packages mounted to the periphery of the vehicle). Therefore, sensor packages disposed on the periphery of the vehicle (e.g. S1-S4 shown in FIG. 1A), may be associated with one or more sensor packages disposed toward the middle of the vehicle (e.g. S5-S8 shown in FIG. 1A) for firing event confirmation. In the embodiment shown in FIG. 1A, S1 may be associated with S6, S2 may be associate with S8, S3 may be associate with S5, and S4 may be associate with S7. However, other configurations are also possible, such as associating all of the peripheral sensor packages with one centrally mounted sensor package, and/or creating dynamic associations in order to tailor the necessary countermeasure response.

In embodiments, the confirmation threshold for the secondary sensor package may be the same as, or different from, the initial threshold for the primary sensor package. For example, as mentioned above, an initial threshold for the primary sensor package may be set such that a SUM of greater than, or equal to, 300 for each of two or more of the accelerometers in the primary sensor package is required. A confirmation threshold for the secondary sensor package may be set such that a SUM of greater than, or equal to, 150 for each of two or more of the accelerometers in the secondary sensor package is required.

In embodiments, determining whether the confirmation threshold is exceeded may be based on a sum of values for a particular sensor package included in a buffer. In embodiments, the sum of values may be, for example, from about a 3 ms window in the buffer. In embodiments, the processor may be configured to initiate the countermeasure within about 10 ms, or less than 15 ms, of the initial acceleration of the primary sensor exceeding the first threshold.

In embodiments, the processor may be configured to make ready a safe and arming device based on the initial acceleration of the primary sensor exceeding the first threshold, prior to making a determination to initiate the a countermeasure. In embodiments, the processor may be configured to make ready the safe and arming device and initiate the countermeasure within about 10 ms of the initial acceleration of the primary sensor exceeding the first threshold.

In embodiments, L may also be evaluated for confirmation. For example, at least two accelerometers in a given sensor may be evaluated to determine whether L is greater than, or equal to, about 100. An example that demonstrates aspects of the above criteria is described below with reference to FIG. 6.

Figure 6:
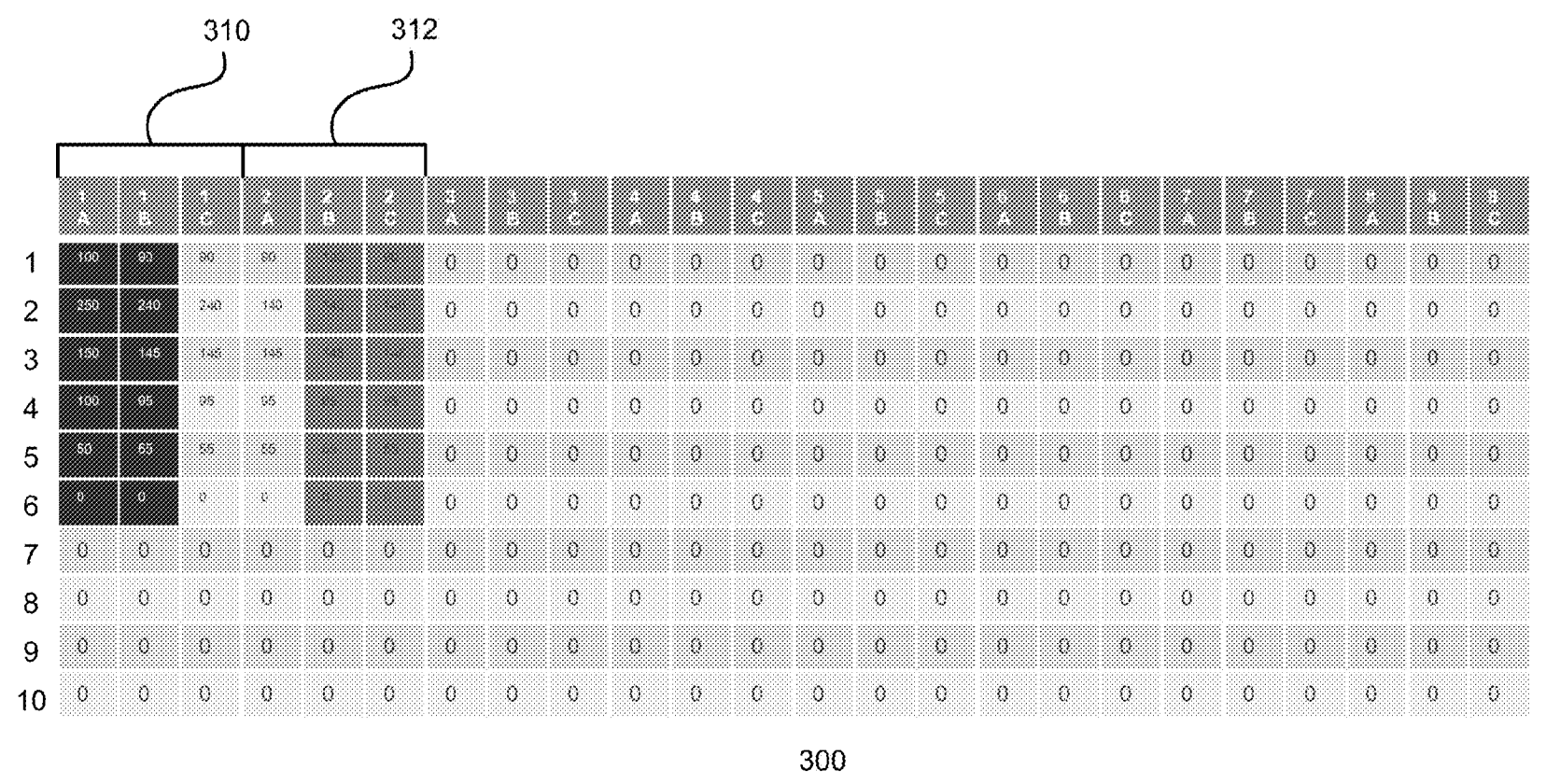

In FIG. 6, sensor package 1, shown in area 310, includes the following data sets in samples 1-6:
1A: 100, 250, 150, 100, 50, 0
1B: 90, 240, 145, 95, 55, 0
1C: 90, 240, 145, 95, 55, 0

Sensor package 2, shown in area 312, included the following data sets in samples 1-6:
2A: 90, 140, 145, 95, 55, 0
2B: 100, 140, 145, 95, 55, 0
2C: 90, 140, 145, 95, 55, 0

First, a SUM of 6 sequential data points in the 10 point buffer may be evaluated to determine whether any two accelerometers in a sensor package have a SUM greater than, or equal to, 300. 1 (SUM 650) and 1B (SUM 625) satisfy this criteria.

Next, a SUM of 6 sequential data points in the 10 point buffer may be evaluated to determine whether any two accelerometers in another sensor package have a SUM greater than, or equal to, 150. 2B (SUM 535) and 2C (SUM 525) satisfy this criteria.

In embodiments, L values for at least two accelerometers may be evaluated to confirm the occurrence of an explosion. For example:
  $L>=100$ for 2 of 3 accelerometers in sensor packages 1-4.
  $L=\Sigma\Delta G$ for 6 sequential points In FIG. 7, sensor package 1, shown in area 310, includes the following data sets in samples 1-6:
1A: 50, 125, 75, 50, 25, −10
1B: 45, 120, 73, 55, 23, −10
1C: 45, 120, 73, 45, 23, 0

Sensor package 2, shown in area 312, included the following data sets in samples 1-6:
2A: 50, 70, 75, 45, 25, 0
2B: 50, 70, 75, 45, 25, 0
2C: 50, 70, 75, 45, 25, 0

For above data:
  1A SUM=315, 1B=306, so sensor 1 meets Sum 300 criteria.
  2B=265, 2C=265, so sensor 2 meets Sum 150 criteria.
  1A L=210 & 1B L=205 so sensor 1 meets L.
L=sum of $\Delta G$'s. e.g. for 1A: $L=|50-125|+|125-75|+|75-50|+|50-25|+|25-(-10)|=210$.

In embodiments, the above results may be used, for example, to initiate countermeasures corresponding to Quadrant 1. That is, referring back to FIGS. 1A and 1B, the determination that S1 satisfies first criteria, and S2 (or other sensor package) satisfying confirmatory criteria, may be used to initiate countermeasures C1-C3 of quadrant Q1. It should be noted that, in some embodiments, multiple sensor packages may be evaluated simultaneously, or near-simultaneously, such that firing decisions for multiple quadrants may be made and acted upon in response to a single event. Further details regarding exemplary processing steps are shown in FIG. 8.

It is noted that the above examples use Sum 300/150 threshold criteria. However, other values are possible. For example, the inventors have found that a Sum 600/350 threshold combination may be desirable.

Table 400 shown in FIG. 8 depicts a number of different criteria and related actions that a system and/or processor according to aspects of the invention may be configured to assess and/or perform. In Table 400, Sensor Packages are listed in column 410, with the individual accelerometers listed in column 412. The first criteria, listed in column 420, relates to whether to make ready a safe and arming device, represented by the step in column 422. In this case, if any of the accelerometers satisfy the criteria of greater than or equal to |50| g, then an ARM signal may be sent to one or more safe and arming devices to make them ready. In embodiments, redundancy may not be required to make the determination to make ready the safe and arming device(s), in order to, for example, accelerate the overall processing timeline. Referring back to the data shown in FIG. 4, the 55 value in sample 1 of accelerometer 1C satisfies this criteria, and may initiate an ARM signal to one or more safe and arming devices to make them ready, regardless of whether any other criteria are satisfied. In embodiments, this may also cause the system to make further evaluations, e.g. by looking at additional acceleration data during a window to determine whether an explosion has occurred and/or whether to initiate an explosion countermeasure or other action.

In column 430, acceleration data may be evaluated to determine whether two or more accelerometers of a sensor package have a SUM value (e.g. for 6 contiguous samples out of the stored in the buffer) greater than or equal to 150.

In column 432, acceleration data may be evaluated to determine whether two or more accelerometers of a sensor package have a SUM value (e.g. for 6 contiguous samples out of the 10 stored in the buffer) greater than or equal to 300. As will be appreciated looking at columns 430 and 432, these steps may be linked together in various ways to streamline processing. For example, the processor may be configured to determine that at least two sensor packages satisfy the lesser criteria of column 430 before proceeding to evaluate one or more of the qualifying sensor packages under column 432. Such processing may be advantageous, for example, in rapidly processing the acceleration data in order to activate necessary countermeasures in under 10 ms. That is, two or more sensors may be determined to satisfy the lesser criteria in column 430 prior to any sensor satisfying the criteria of column 432. Therefore, as soon as column 432 is satisfied, the processing may proceed, without having to go back and confirm the lesser criteria.

Embodiments may also include making a determination in column 434 with respect to L for two or more accelerometers in a sensor package, as discussed previously.

In column 440, an activation signal for one or more explosive countermeasure may be sent based on the satisfaction of one or more of columns 430, 432 and/or 434. Aspects of the foregoing are also shown in the state machine diagram included in FIG. 9.

The process flow 500 may begin with a POWER ON state 510. The process may proceed with a self test state 512 that may be required to ensure the countermeasure system is fully functional, that a required number of accelerometers are functional, that acceleration values in the buffer are zeroed out, etc. Once the self test is passed, the processing may continue with state 514.

In state 514, the buffer values may be evaluated to determine whether any values exceed the threshold for making ready the safe and arming device(s). The processing may continue to monitor the buffer for this criteria until it is satisfied, or until the system is powered off. If the threshold for making ready the safe and arming device(s) is exceeded, the processing may continue with state 516.

In state 516, an ARM signal may be sent to make ready the safe and arming device(s), and the buffer values may be further evaluated to determine whether any values in the buffer still exceed the threshold for making ready the safe and arming device(s). In the event that no buffer values exceed the threshold for making ready the safe and arming device(s), the processing may return to state 514, in which the safe and arming devices are made safe again.

In state 516, the buffer values may also be further evaluated to determine whether values in the buffer satisfy the requirement(s) to activate an explosion countermeasure. This may include, for example, comparing absolute g values, and/or SUM values, for one or more accelerometers in one or more sensor packages. In one embodiment, state 516 may include evaluating the values to determine whether an absolute g value (e.g. 50 g, 75 g, 100 g, 125 g, 150 g, 175 g, 200 g, etc.) has been exceeded for two or more sensors of a sensor package. In other embodiments, a SUM for each of at least two accelerometers in one sensor package may be evaluated to determine whether each SUM exceeds a first threshold, e.g. greater than or equal to 100, 150, 200, 250, 300, 350, 400, etc.

In state 518, the determination to activate an explosion countermeasure may be made. In embodiments, this may be based on an evaluation made in state 516, and/or may include additional processing. For example, state 518 may include an additional comparing of absolute g values, and/or SUM values, for one or more accelerometers in one or more sensor packages. In one embodiment, state 518 may include evaluating the values to determine whether an absolute g value (e.g. 50 g, 75 g, 100 g, 125 g, 150 g, 175 g, 200 g, etc.) has been exceeded for two or more sensors of a sensor package (other than that of state 516). In other embodiments, a SUM for each of at least two accelerometers in one sensor package (other than that of state 516) may be evaluated to determine whether each SUM exceeds a threshold, e.g. greater than or equal to 100, 150, 200, 250, 300, 350, 400, etc. (which may be the same, or different than, a threshold applied in state 516). In one embodiment, the threshold applied in state 518 is greater than the threshold applied in state 516. In another embodiment, the threshold applied in state 518 is less than the threshold applied in state 516.

Once a decision to activate an explosion countermeasure is made in state 518, a FIRE command signal may be sent to one or more countermeasures depending on, for example, the sensor packages meeting the selected criteria, and quadrant correspondence of sensor packages and/or countermeasures. It should be noted that, according to certain embodiments, the processing between states 514 and 518, i.e. between detecting a value that justifies making ready the safe and arming device, and activating an explosion countermeasure, may be accomplished in 10 ms or less.

Processing may further include making safe any unfired quadrants by returning to state 516, evaluating the buffer to determine whether any values still exceed the threshold for making ready the safe and arming device(s), and returning to state 514 when no values are found that exceed the threshold for making ready the safe and arming device(s). FIG. 10 includes additional state descriptions for the state machine represented in FIG. 9.

Figure 9:
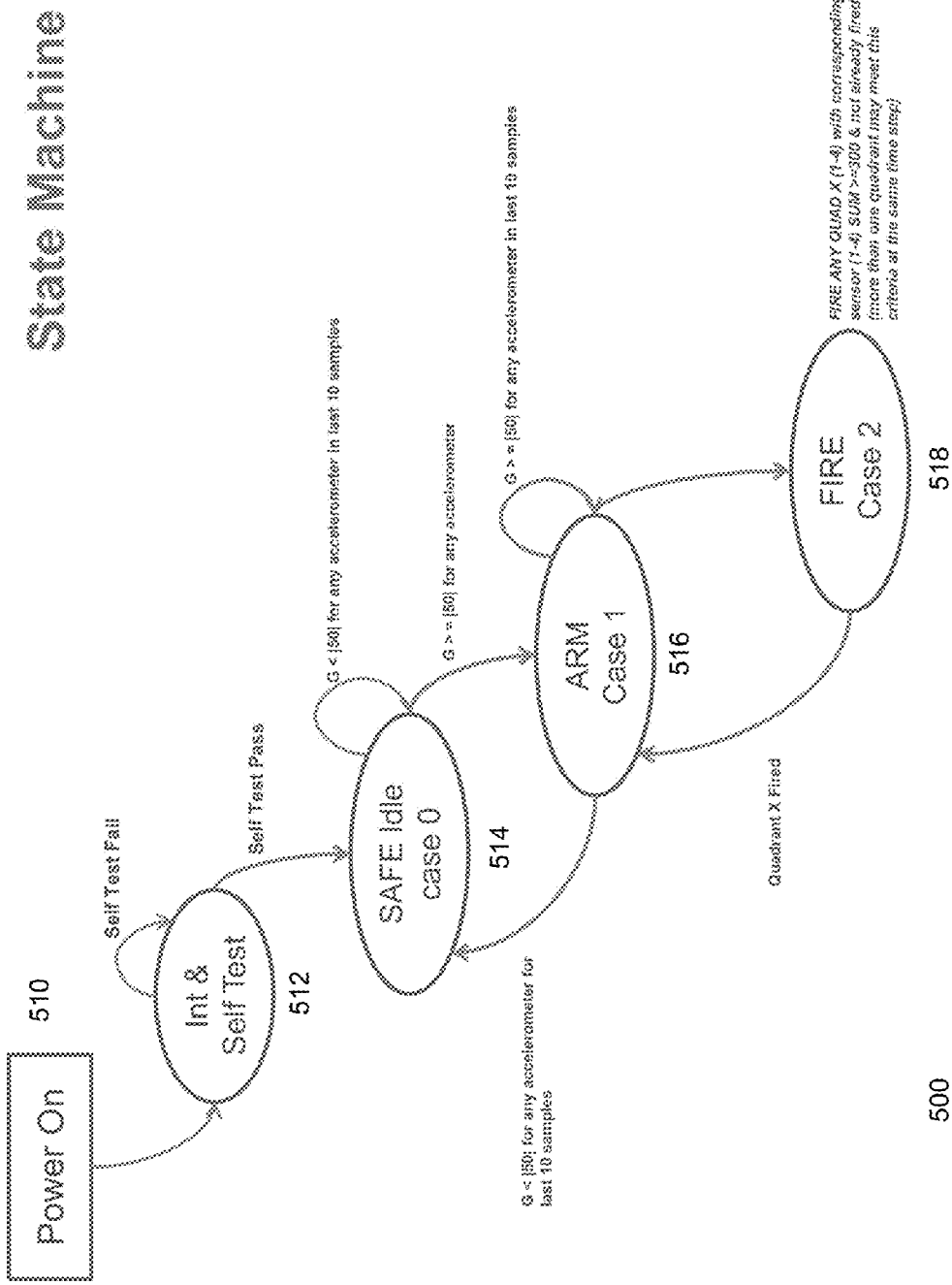
FIG. 9 is a state machine diagram showing exemplary machine states according to aspects of the invention.

The states shown in the table of FIG. 10 include, "Int and Self Test" corresponding to state 512 in FIG. 9, "Safe Idle" corresponding to state 514 in FIG. 9, "Arm" corresponding to state 516 in FIG. 9 and "FIRE" corresponding to state 518 in FIG. 9.

As described above, exemplary systems and methods may use multiple sensor packages, each containing multiple accelerometers. It should be further understood that sensing systems and algorithm described herein can be configured to function through individual sensor data drop-outs. For example, exemplary systems may be configured such that data interruption from any one of the available sensor packages (e.g. S1-S4 and/or S5-S8) will not preclude determining that an explosion has occurred based on data received from the remaining sensors. Embodiments may include allowing the system to adjust the sensor packages associated with one another in the event that there is a data drop-out from one or more of the sensor packages. For example, referring back to FIG. 1A, if sensor package S1 is associated with sensor package S6, and sensor package S6 experiences a data drop-out, then the system may look to one or more of sensor packages S5, S7, S8 to confirm a firing event for S1. Additionally, exemplary systems may be configured such that data interruption from any one of the accelerometers within a sensor package (e.g. 1A, 1B, 1C) will not preclude determining that an explosion has occurred based on data received from the remaining accelerometers.

According to aspects of the invention, such as those described above, the present subject matter may provide an effective active blast countermeasure system using sensor ranges, settings and evaluation criteria that are significantly different from other systems used, for example, in automotive airbag systems. For example, EP 1043194, published Apr. 4, 2001 and entitled "AIRBAG DEPLOYMENT DEVICE AND CONTROL," describes an airbag system in which determinations are made regarding whether an impact exceeding a predetermined level (TIMPACT) has occurred. In this regard, EP 1043194 state that the magnitude of TIMPACT typically corresponds to a change in acceleration of approximately 2-3 g. According to aspects of the invention, forces that are orders of magnitude greater than 2-3 g may be advantageously used, e.g. greater than 30 g, greater than 40 g, in a range of about 30 g to 60 g, in a range of about 40 g to 60 g, or about 50 g, have been determined by the inventors to be appropriate thresholds as described herein. Such differences may be advantageous, for example, for use in military vehicles that may experience collision-like shocks on a routine basis, avoiding sensor saturation and/or damage due to extreme forces resulting from an explosive blast, as well as ensuring that active blast countermeasures are only deployed as a result of an explosive blast and not a vehicle collision.

According to further aspects of the invention, the present subject matter may provide an effective active blast countermeasure system using processing techniques and/or times, and countermeasure deployment procedures and/or times, that are significantly different from other systems used, for example, in automotive airbag systems. For example, WO/2000/040438, published Nov. 30, 2000 and entitled "AIRBAG ACTUATION EVENT DISCRIMINATION SYSTEM AND METHOD," describes the advantages of inhibiting the deployment signal for airbags during a predetermined time period following detection of a sensor signal that exceeds a first threshold, and ceasing inhibition of the deployment signal after the predetermined time period has expired. In this regard, WO/2000/040438 states that car airbag systems may rely on lateral acceleration and may employ delays to avoid unnecessary deployments, e.g. of a period of about 7.5 ms. As described therein, calculation of the deployment algorithm begins at around 10 ms, and the deployment decision of the side airbags is inhibited, e.g. for 7.5 ms, such that the deployment decision is inhibited from 10 ms through 17.5 ms. Thus, the deployment signals are not sent until around 17.5 ms. On the contrary, according to aspects of the invention, processing, making ready a safe and arming device, and activating blast countermeasures may be accomplished, for example, in 10 ms or less, or 15 ms or less. Such differences may be advantageous, for example, for countering otherwise catastrophic explosive blasts, in ways that typical airbag systems would not be able to, or would be effectively prevented from providing.

Figure 11:
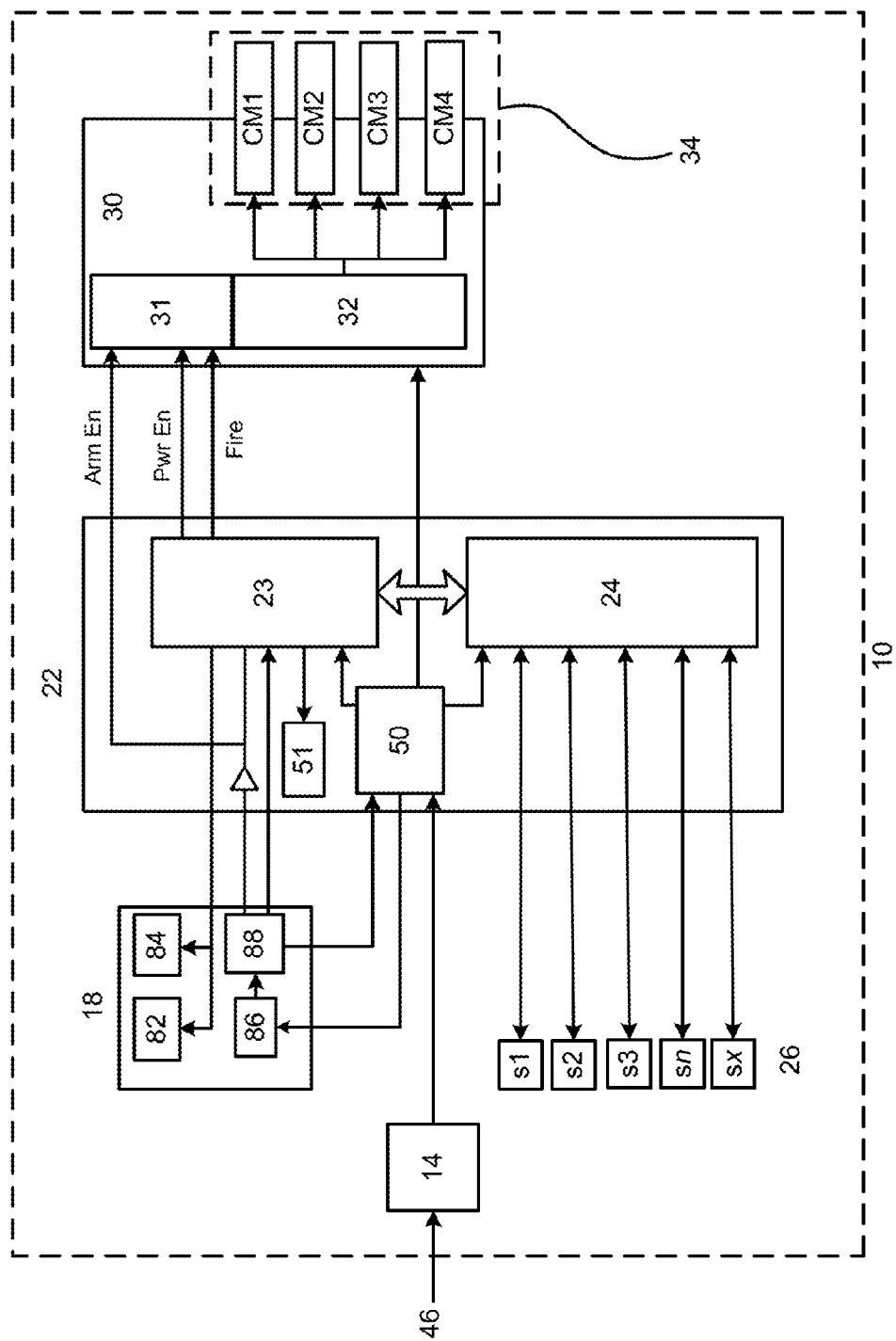
FIG. 11 is a schematic block diagram of aspects of an exemplary TAS consistent with the present invention.

Depicted in FIG. 11 is a block diagram of an exemplary trigger and activation system (TAS) 10 of the present invention. TAS 10 may include first responder unit (FRU) 14, control display assembly (CDA) 18, processor 22, one or more sensors 26, electronic safe and arm device (ESAD) 30, and one or more countermeasures 34. Although conceivably useful wherever force-related countermeasures are desirably deployed, as to prevent vehicle rollover, for example, TAS 10 is especially designed for use in connection with a vehicle operating in a theatre in which IEDs, mines, or other explosive devices may be present.

A processor 22 (which may be configured in various ways described herein), may include, for example, a microcontroller 23 connected via a bus to interface system (IC) 24, power conditioner 50, data recorder 51, and various other electronic storage, and/or communication means known by those of skill in the art. IC 24 may be connected to a plurality of sensors 26, including acceleration sensor packages S1-S4, as well as various other sensor types (sx), which may include, for example, cameras, light sensors, radiation sensors, deformation sensors, heat sensors, pressure sensors, contact sensors, proximity sensors, strain sensors, and force sensors.

In embodiments, the processor 22 may be in communication with other sensor types (sx) that sense a different type of condition than the acceleration sensors, and the processor 22 may be configured to process signals received from the other sensor devices in determining whether to initiate the countermeasure. For example, when the other sensor types (sx), include cameras, light sensors, radiation sensors, deformation sensors, heat sensors, pressure sensors, contact sensors, proximity sensors, strain sensors, and/or force sensors, one or more of change in light patterns, detected light, radiation, pressure, temperature, contact, proximity, strain and/or force may be required as a confirmation threshold that further informs the decision making process on whether an explosion has occurred, and/or whether to activate a countermeasure. However, it should be noted that the inventors have found that an acceleration sensor-only system has certain advantages in sensor robustness, ease of integration on a vehicle, as well as speed and accuracy in making such determinations.

ESAD 30 may include various components including, for example, controller 31 including hardware and/or software for processing signals including Arm, Power and Fire instructions received from the processor 22. ESAD 30 may further include a safety 32 through which firing signals to any of countermeasures 34 must pass. Controller 31 may be configured to power on, or otherwise make ready, safety 32 such that Fire instructions received from the processor 22 are communicated, e.g. by electrical current sufficient to activate an initiator, to appropriate countermeasures 34.

The ESAD 30 may function to arm and initiate countermeasures 34 upon command of processor 22. Like various other aspects of the inventive systems, the ESAD 30 preferably "fails safe"—i.e. if it is non-functional, it enters or reverts to a mode in which countermeasures 34 cannot activate. Fuze cord or any other suitable material may connect the ESAD 30 to the countermeasures 34. In embodiments, the ESAD 30, or other safe and arming device, may be collocated with the countermeasure, e.g. in a countermeasure cartridge.

With TAS 10 in the "arm enable" mode, processor 22 controls deployment of countermeasures 34. Processor 22 directly or indirectly receives signals from sensors 26 (e.g. via IC 24 and any busses) and determines (1) if making ready ESAD 30 is appropriate, and (2) if deployment of any countermeasure 34 is appropriate. If making ready and/or deployment is appropriate, as described further herein, processor 22 signals ESAD 30 accordingly. In some versions of the invention, processor 22 may be housed in an enclosure having deformable brackets so as to allow dampening of shocks otherwise likely experienced by the processor 22.

FRU 14 may include, for example, a switch interposed in the main power supply line 46 of the vehicle between a vehicle power supply (e.g. a battery or electrical generator) and ESAD 30 to which countermeasures 34 are connected. If the switch in FRU 14 is open, electricity is not available for ESAD 30 to arm the countermeasures 34 for deployment.

In embodiments, various parts of the TAS may be connected to and/or include an auxiliary power source, in addition to the main power supply line 46 of the vehicle. For example, power conditioner 50 may be connected to and/or include an auxiliary power source sufficient to power essential parts of the TAS 10 for a period of time sufficient to deploy countermeasures if the vehicle experiences an IED blast that disrupts power from main power supply line 46. The auxiliary power source may be, for example, a capacitor (e.g. a 27,000 uF super capacitor) that allows the system to function for at least 100 ms after battery power is lost. This can assure a functioning system even if the battery power is lost from the IED blast.

As noted in FIG. 11, CDA 18 beneficially may, but need not necessarily, include a system status indicator 82, a safety status indicator 84, a power indicator 86, and an armed power control indicator 88. CDA 18 additionally advantageously may be powered by power supply 46 (albeit perhaps after the power undergoes conditioning by power conditioner 50), although other sources of electricity possibly may be used instead. Outputs of CDA 18 may be connected electrically to (at least) processor 22.

According to aspects of the invention, the processes described herein may be advantageously employed to activate explosion countermeasures, some examples of which are described below.

Countermeasures themselves may be of varying types yet remain consistent with the present invention. Advantageously, however, countermeasures may include cartridges into which ejectable masses and charges are loaded. Currently preferred ejectable masses are predominantly solids (as opposed to liquids or gases), with preferred solids either being disintegrable or comprising multiplicities of disintegrated particles. If so, the likelihood of serious injury to a bystander impacted by a portion of the ejected mass may be reduced.

Cartridge countermeasures may be placed in barrels mounted to or otherwise connected or attached to vehicles. The barrels may be constructed in sets or individually as desired and configured to receive cartridges in any manner allowing initiation of the propellant. In some versions of the invention, banks of barrels are mounted at the four corners of the roof of a vehicle. Alternatively or additionally, barrels may be mounted on vehicle sides, fronts, or rears. Presently preferred in some versions is that barrels not be placed on the vehicle undercarriage, although such placement could occur in other versions. Because the cartridges are separate from the barrels, the cartridges may be transported apart from the barrels and loaded only when needed, further reducing risk of undesired countermeasure deployment.

Figure 12:
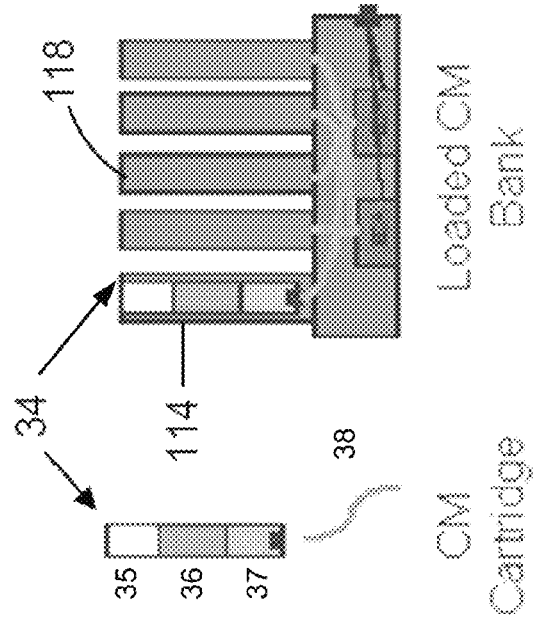
FIG. 12 depicts an exemplary countermeasure, and bank of countermeasures, according to aspects of the invention.

FIG. 12 illustrates a sample countermeasure 34. Countermeasure 34 may be assembled as a cartridge to facilitate shipping and storage, for example. It may include a housing containing a mass 35 and/or propellant 36, and charge 37. Countermeasure 34 may connect to ESAD 30 and an initiator using conventional detonation cord 38.

Presently-preferred masses 35 are predominantly solids (rather than liquids or gases). Such preferred solids either are disintegrable upon ejection from the vehicle or comprise multiplicities of disintegrated particles. Disintegration of mass 35 upon deployment of countermeasure 34 is preferred so as to reduce likelihood of serious injury to at least some bystanders possibly impacted by mass 35.

Charge 37 may be or include any propellant or other substance capable of causing a countermeasure 34 to eject from a vehicle. Upon receipt of a suitable signal from processor 22, ESAD 30 activates an initiator, which in turn ignites detonation cord 38 connected to a countermeasure 34. Detonation of cord 38 causes deflagration (if pyrotechnic) or other activation of charge 37 and/or propellant 36 so as to eject mass 35 from the vehicle. A single initiator may be employed to launch any number of countermeasures 34; alternatively, each countermeasure 34 may be associated with a separate initiator. To expedite initiation, capacitors associated with one or more initiators may be pre-charged under certain conditions, such as when the ESAD is made ready.

FIG. 12 also depicts a countermeasure (CM) bank assembly including a plurality of barrels 114 with openings 118 for housing countermeasures 34. The CM banks may be assembled to a vehicle domestically, or at a field depot in theater. CM cartridges, FCDC connectors and ESADs may be shipped separately, with the CM cartridges installed in theater. The CM cartridges may be removable from the vehicle for shipping, and may come with, for example, flexible confined detonating cord connector to aid in installation and removal.

Figure 13:
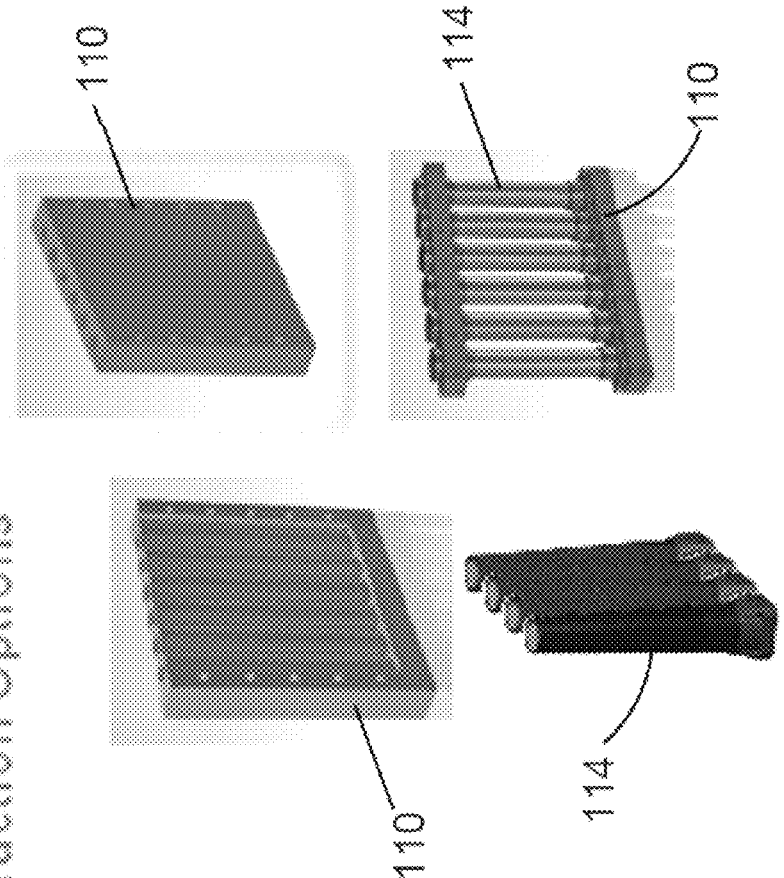
FIG. 13 depicts various views of possible configurations of countermeasures of the type shown in FIG. 12.

FIG. 13 depicts various examples of banks 110 of barrels 114 into which countermeasure 34 may be loaded. Banks 110 may be mounted to vehicles at any suitable time either before or after the vehicles enter a hostile environment. Although cartridges of countermeasures 34 likewise may be loaded into barrels 114 at any time, preferably they remain unloaded until a vehicle is slated to approach or enter an environment in which deployment of countermeasures 34 may be considered reasonably likely. Barrels 114 may be made of metal, composites, or other suitable material and may be attached to or formed within banks 110.

FIG. 13 schematically illustrates one embodiment with a bank 110 containing five barrels 114, one of which is loaded with a countermeasure 34. Bank 110 may be mounted onto a vehicle (see, e.g., FIG. 14) in any desired location. In some embodiments of the invention, a bank 110 is mounted onto a vehicle at or adjacent each of its four corners (front left, front right, rear left, rear right).

Depending on the locations and types of forces encountered by sensors 26, any one or more banks 110 may launch countermeasures 34. Moreover, if a bank 110 includes more than one barrel 114, less than all countermeasures 34 loaded in the barrels 114 may be launched at any particular time. Launching of countermeasures 34 further may be staggered or sequenced in time (either within a particular bank 110 or between particular banks 110).

Presently preferred is that barrels 114 be vertical (or substantially so) with their openings 118 positioned upward when mounted to a vehicle. In this manner, a countermeasure 34 will be ejected upward from the vehicle upon deployment, producing a downward force vector upon ejection. Such downward force vector is intended to counteract (in whole or in part) an upward force impacting a vehicle because of, e.g., explosion of a mine or IED, collision of the vehicle with an object, or departure of the vehicle from a roadway or other normal travel surface.

Alternatively, one or more barrels 114 could be tilted or otherwise repositionable relative to a (nominal) vertical orientation. If so, deployment of materials loaded therein could be used to establish different force vectors acting on a vehicle, or the barrels 114 (regardless of orientation) could be used to deploy flares, missiles, projectiles, or other objects for various purposes. Because banks 110 themselves may have substantial mass, they may function as armor for a vehicle. Reactive armor plates or tiles may be deployed, as may any mass associated with a vehicle (e.g. engine, engine cover, battery, water supply, passive armor, etc.).

Figure 14:
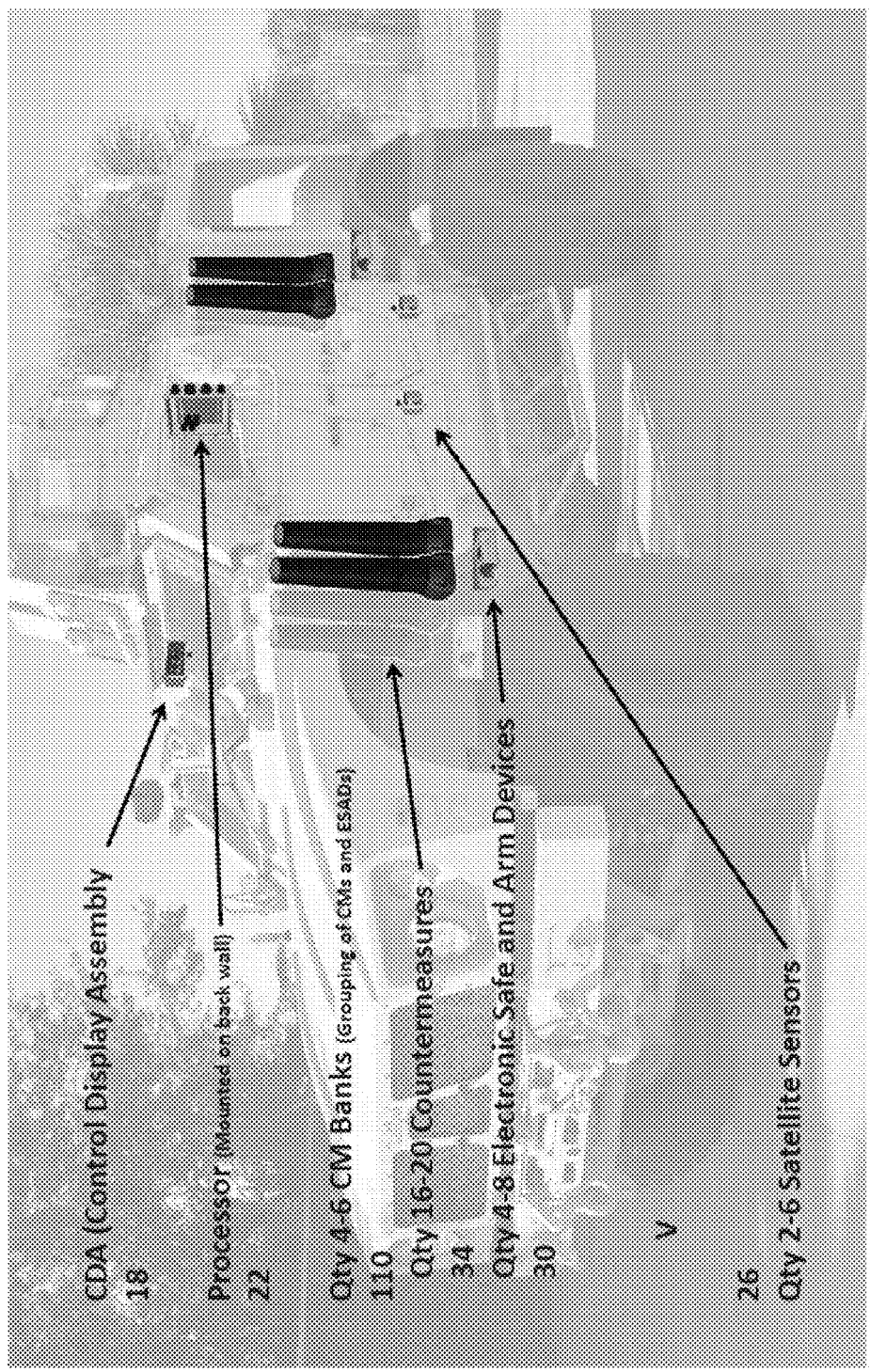
FIG. 14 is a perspective view of a vehicle including a countermeasure system according to aspects of the invention.

FIG. 14 shows aspects of an explosion countermeasure system disposed on a vehicle. For example, the vehicle shown in FIG. 14 includes a CDA 18 mounted in view of a driver, a processor 22 mounted within the vehicle, a plurality of countermeasures 34, and Safe and Arming devices 30 for each of the countermeasure groups.

In some embodiments, a computer-readable medium containing computer-readable instructions recorded thereon is provided. For example, one or more memory devices (included in, or in communication with, processor 22 shown in FIG. 11) may store an application or computer program product accessible from a computer-usable or computer-readable medium providing program code for use by or in connection with processor 22 or any instruction execution system. For the purposes of this description, a computer-usable or computer-readable medium may include any tangible medium or apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks may include compact disc read-only memory (CD-ROM), a rewritable compact disc (CD-R/W), and digital video disc (DVD).

A data processing system (e.g., processor 22 shown in FIG. 11) is suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) may be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

While various embodiments have been described above in the context of a master-slave arrangement, any wireless protocol using any wireless communication standard may be supported by the systems and methods described herein. In addition, although Bluetooth devices are specifically used in some of the illustrative examples described herein, any electronic device may be adapted to support the facilitated device connection and pairing techniques disclosed herein. For example, devices may initiate facilitated connections with other devices, peripherals and APs. Furthermore, it is to be understood that the various embodiments described above may be used and adapted for other types of delays not specifically described herein. It is to be understood that the examples and embodiments described above are for illustrative purposes only and that various modifications or changes in light thereof will be suggested to persons skilled in the art, and are to be included within the spirit and purview of this application and scope of the appended claims. Therefore, the above description should not be understood as limiting the scope of the invention as defined by the claims.

What is claimed is:

1. An explosion countermeasure system, comprising:
a first sensor device including a plurality of accelerometers configured to detect vertical acceleration of a vehicle; and
a processor in communication with said first sensor device, said processor configured to process acceleration signals received from said first sensor device and to initiate a countermeasure based on results of processing the acceleration signals;
wherein, said plurality of accelerometers are included in a sensor package and arranged to detect acceleration in the same direction,
the accelerometers in said sensor package share a sampling channel, with each of the accelerometers in said sensor package being assigned a different time slot, and
said processor is further configured with an integration module that integrates the acceleration signals to calculate a change in velocity, and initiating the countermeasure is based on (a) an initial acceleration exceeding a first threshold, and (b) a velocity change exceeding a second threshold.

2. The system of claim 1, wherein said sensor package provides acceleration signals with a combined sampling rate of 6 kHz.

3. The system of claim 1, comprising a plurality of said sensor packages.

4. The system of claim 1, comprising at least five of said sensor packages.

5. The system of claim 1, wherein initiating the countermeasure requires accelerations determined from at least two of said sensor packages to each exceed the first threshold.

6. The system of claim 1, wherein the determination to initiate the countermeasure requires an acceleration determined from one of said sensor packages to exceed the first threshold, and an acceleration determined from another of said sensor packages to each exceed another acceleration threshold, the other acceleration threshold being different than the first threshold.

7. The system of claim 1, wherein the processor is further configured to selectively initiate individual countermeasures in different areas of the vehicle based on signals received from different sensor packages associated with each of the different areas of the vehicle.

8. The system of claim 1, wherein the first threshold is greater than 40 g.

9. The system of claim 1, wherein the first threshold is in a range of 40 g to 60 g.

10. The system of claim 1, wherein determining whether the second threshold is exceeded is based on a sum of values for a particular sensor package included in a buffer.

11. The system of claim 10, wherein the sum of values is obtained from a 3 ms window in the buffer.

12. The system of claim 1, wherein the processor is configured to initiate the countermeasure within 10 ms of the initial acceleration exceeding the first threshold.

13. The system of claim 1, wherein the processor is further configured to make ready a safe and arming device based on the initial acceleration exceeding the first threshold, prior to making a determination to initiate the at least one countermeasure.

14. The system of claim 13, wherein the processor is configured to make ready the safe and arming device and initiate the at least one countermeasure within 10 ms of the initial acceleration exceeding the first threshold.

15. The system of claim 13, further comprising the safe and arming device.

16. The system of claim 1, wherein the processor is further configured to selectively initiate individual countermeasures from among a plurality of countermeasures, to make ready safe and arming devices for all of the plurality of countermeasures based on the initial acceleration exceeding the first threshold, and to disarm at least one of the safe and arming devices based on buffered acceleration data for one or more of the sensor packages falling below the first threshold for a predetermined period of time.

17. The system of claim 1, further comprising at least one countermeasure device, wherein the at least one countermeasure device includes one or more of a mass ejector and a thruster.

18. The system of claim 1, wherein the processor is further configured to initiate an occupant protection device.

19. The system of claim 1, wherein the processor is in further communication with a second sensor device that senses a different type of condition than the first sensor device, and the processor is further configured to process signals received from said second sensor device in determining whether to initiate the countermeasure.

20. An explosion countermeasure system, comprising:
a first sensor device including a plurality of accelerometers configured to detect vertical acceleration of a vehicle;
a countermeasure;
a safe and arming device configured to impede activation of said countermeasure;
a processor in communication with said first sensor device and said safe and arming device, said processor configured to process acceleration signals received from said first sensor device and to make ready the safe and arming device and initiate the countermeasure based on results of processing the acceleration signals;
wherein, making ready the safe and arming device is based on an initial acceleration exceeding a first threshold,
initiating the countermeasure is based on the initial acceleration exceeding a second threshold, and a velocity change exceeding a third threshold, and the velocity change is calculated based at least in part on integrating a plurality of acceleration readings.

21. The system of claim 20, wherein the first and second thresholds are substantially equal.

22. The system of claim 20, wherein the first threshold is greater than 30 g.

23. The system of claim 20, wherein determining whether the third threshold is exceeded is based on a sum of values for a particular sensor included in a buffer.

24. The system of claim 20, wherein the processor is configured to make ready the safe and arming device and initiate the countermeasure within 10 ms of the initial acceleration exceeding at least one of the first threshold and the second threshold.

25. An explosion detection system comprising:
a communication bus in communication with a plurality of sampling channels, each sampling channel including multiplexed acceleration signals from a plurality of sensors included within a sensor package; and
a processor configured to
process the multiplexed acceleration signals from the plurality of sampling channels,
determine the occurrence of an explosion based on the acceleration signals, and
initiate an explosion countermeasure based on the determination that an explosion has occurred,
wherein processing the multiplexed acceleration signals includes determining an acceleration value for the sensor package based on the acceleration signals from at least two of the plurality of sensors included within the sensor package, and
an effective sampling rate for the sensor package is greater than a sampling rate of each of the plurality of sensors included within the sensor package.

26. The system of claim 25, wherein, the effective sampling rate is 6 kHz.

27. The system of claim 25, wherein the processor is configured to determine the occurrence of the explosion and initiate the explosion countermeasure within 10 ms of registering an initial acceleration exceeding a first threshold.

28. The system of claim 27, wherein the processor is further configured to initiate charging of a safe and arming device based on the initial acceleration exceeding the first threshold, prior to making a determination to initiate the explosion countermeasure.

* * * * *